Dec. 15, 1931.  W. TRINKS ET AL  1,836,410
SHEET GLASS APPARATUS
Filed Dec. 5, 1928
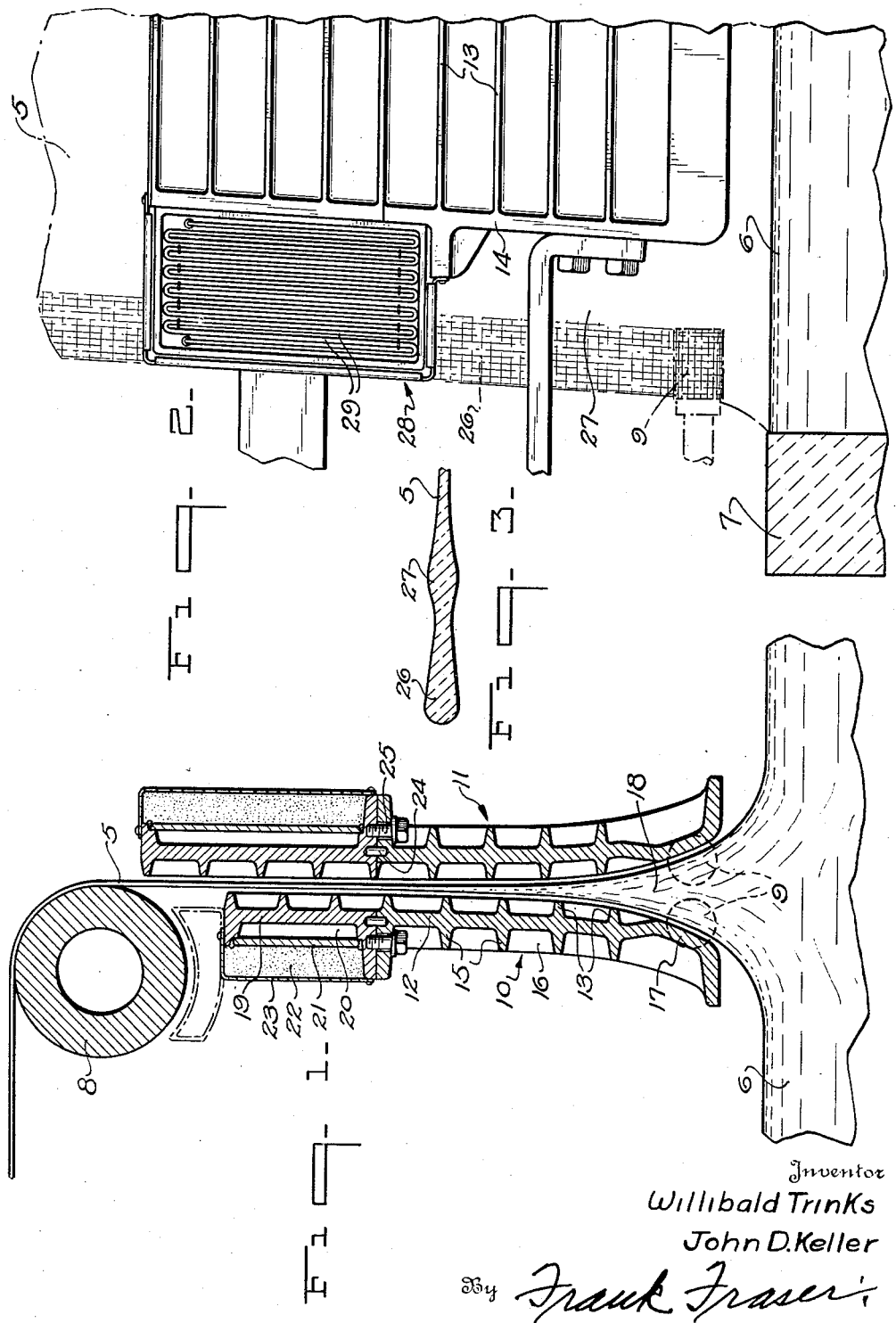
Inventor
Willibald Trinks
John D. Keller
By Frank Fraser
Attorney Patented Dec. 15, 1931

1,836,410

UNITED STATES PATENT OFFICE

WILLIBALD TRINKS AND JOHN D. KELLER, OF PITTSBURGH, PENNSYLVANIA, ASSIGNORS TO LIBBEY-OWENS-FORD GLASS COMPANY, OF TOLEDO, OHIO, A CORPORATION OF OHIO

SHEET GLASS APPARATUS

Application filed December 5, 1928. Serial No. 323,921.

The present invention relates generally to the drawing of glass in flat sheet form from a bath of molten glass, and more especially to the provision of improved means for shielding the sheet during the drawing thereof.

In the production of sheet glass in accordance with one of the processes now in use, the sheet is drawn upwardly from a bath of molten glass for a suitable distance and then while still in a semi-plastic condition, although substantially set in its final sheet form, is deflected into the horizontal plane and passed horizontally through an annealing leer. In such process, there is sometimes a tendency toward the formation of longitudinal waves in the sheet as the said sheet is drawn upwardly from the bath of molten glass, said waves usually appearing as vertical streaks in the sheet. The formation of these waves is believed to result principally from the setting up of convection currents in the air and gases surrounding the sheet and partially from drafts and puffs of gases issuing from the furnace. The convection currents act to chill the glass sheet unevenly and thereby cause it to draw unevenly.

The principal object and aim of this invention is the provision of improved shielding means for protecting the sheet during the drawing thereof, said means functioning to eliminate or break up the convection currents above described, whereby the formation of longitudinal waves in the sheet from this cause may be obviated. In addition, the shielding means serves to protect the sheet from drafts and puffs of gases from the furnace and further prevents dirt, dust and other foreign matter from coming in contact therewith. By eliminating the convection currents, the shielding means tends to render cooling and contraction of the sheet more uniform.

Another object of the invention is the provision of shields arranged at opposite sides of the sheet for protecting the same and having incorporated therewith novel temperature control means.

A further object of the invention is the provision of electric heating means associated with the shields for heating and thus softening the thickened or knurled edge portions formed on the sheet during the drawing operation, whereby to facilitate proper bending of the sheet from one plane to another.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through the improved shields provided by the present invention showing them associated with one type of sheet glass drawing apparatus.

Fig. 2 is a fragmentary transverse section through the drawing apparatus showing a front elevation of a portion of one of the shields, and Fig. 3 is a detail section of one of the sheet edges.

While, in the accompanying drawings, there is illustrated diagrammatically one particular type of sheet glass drawing apparatus with which the improved shields provided by the present invention might be incorporated, it is to be understood that the use of said shields is not to be restricted to the specific drawing apparatus disclosed. In the process of drawing sheet glass herein illustrated by way of example, however, the sheet 5 is drawn upwardly from a mass or bath of molten glass 6 suitably contained within a receptacle or the like 7. The glass sheet 5 is drawn upwardly from the surface of the molten bath for a suitable distance and then, while still in a semi-plastic condition although substantially set in its final sheet form, is deflected into the horizontal plane about a bending member or roll 8 and passed horizontally through an annealing leer, not shown. For the purpose of maintaining the sheet to width, any suitable width maintaining means may be utilized such as for instance the knurled rollers 9 which are arranged to engage opposite sides of the sheet at both edges thereof.

As brought out above, this invention, in its general aspect, contemplates the provision of improved means for shielding the glass sheet during its vertical draw. The shields herein provided are adapted to be mounted at opposite sides of the sheet 5 and are designated in their entirety 10 and 11 respectively. Each shield proper consists essentially of a metallic plate 12 provided upon its inner surface with a plurality of spaced horizontal baffles or ribs 13 connected at their opposite ends by substantially vertical marginal ribs 14, and upon its outer surface with a plurality of spaced horizontal baffles or ribs 15 connected at their opposite ends by the substantially vertical marginal ribs 16. The lower end portion 17 of each shield is shaped to conform to and substantially fit within the curvature of the sheet meniscus 18. The back of the upper portion 19 of each shield is provided with a chamber or duct 20 extending transversely thereof and closed by means of a plate 21 welded or otherwise suitably secured in position. The plate 21 is preferably backed by a layer of insulation 22 held in place by a plate or casing 23. The cooling medium may be introduced into the duct or chamber 20 at the center thereof and permitted to flow toward and exit from the opposite ends or, if desired, the cooling medium may be introduced into the duct at the opposite ends and allowed to exit at the center. It will be noted that the shields comprise upper and lower separable sections secured in superposed relation by the aligning pins 24 and machine screws 25. The two shields are preferably of the same construction, the shield 11 at the side of the sheet opposite the bending roll extending considerably higher than the shield 10.

In the case of natural convection or circulation, there is a practically stagnant layer or film of air or gas in contact with any flat surface along which convection currents are set up. This air layer or film has practically no motion at the solid surface, but its velocity increases as the distance from the surface increases. The thickness of a stagnant air layer of this kind depends upon the temperature of the surface. For example, it is estimated at ¾ inch on surfaces at about 400° F. but on hotter glass surfaces it would doubtless be thinner. The shields herein provided are therefore adapted to be placed sufficiently close to the surfaces of the glass sheet so that the baffles or ribs thereof will project inside the stagnant air layer or film in contact therewith, whereby they will prevent or break up the formation of convection currents adjacent the surfaces of the sheet. If the shields are set close enough to the sheet surfaces, the convection currents will be effectively eliminated. Furthermore, the shields, due to their close proximity to the glass sheet, will protect the same from drafts, puffs of gases issuing from the furnace and from dirt, dust and other foreign matter. The shields are preferably constructed of a heat resisting alloy such as nichrome, or some other similar metal.

As shown in Fig. 3, during the drawing of the sheet in accordance with the process herein disclosed, the knurled rollers 9 form heavy or knurled edges 26 on the sheet and adjacent which edges are thickened strips of glass 27. It is essential that these knurled edges and the thick strips of glass adjacent thereto be heated and thus softened in order to permit proper bending of the sheet from the vertical into the horizontal plane about the bending roll 8. Accordingly, electric heaters are herein provided for accomplishing this purpose. These heaters can be easily regulated to permit desired graduation of the heat and further give out a clean heat which will not dirty the sheet. It will be noted upon reference to Fig. 2 that the shields proper extend only across the main central body portion of the sheet and carried by each side of each shield preferably adjacent the upper end thereof and projecting outwardly therebeyond is an electric heater designated generally by the numeral 28. The electric heaters 28 are positioned opposite the knurled edges of the sheet and the thick strips of glass adjacent thereto. The heater wires 29 are preferably arranged in the manner shown in Fig. 2 and in order to avoid hot streaks in the knurled edges of the sheet, they are not exactly parallel to the line of motion of the sheet edge but preferably diverge slightly therefrom. The particular construction of the heaters together with a preferred means for mounting and adjusting the shields is more specifically described and claimed in our copending application filed December 3, 1928, Serial No. 323,335.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim

1. In sheet glass apparatus, the combination with means for forming a sheet from a mass of molten glass, of a shield arranged at one side of the sheet for protecting the same, the lower portion of the shield being shaped to fit substantially in the curvature of the sheet meniscus and the upper portion thereof being provided with a duct at the back thereof extending transversely of the sheet and through which is adapted to be circulated a temperature control medium.

2. In sheet glass apparatus, the combination with means for forming a sheet from a mass of molten glass, of a shield arranged at one side of the sheet for protecting the same, said shield being provided with a plurality of spaced horizontal ribs on the side thereof facing the sheet and with a duct at the opposite side thereof extending transversely of the sheet and through which is adapted to be circulated a temperature control medium, the lower portion of the shield being shaped to fit substantially in the curvature of the sheet meniscus.

3. In sheet glass apparatus, the combination with means for forming a sheet from a mass of molten glass, of a shield arranged at one side of the sheet for protecting the same, said shield being provided with a duct at one side thereof only through which is adapted to be circulated a temperature control medium, and means for insulating the rear wall only of said duct.

4. In sheet glass apparatus, the combination with means for forming a sheet from a mass of molten glass, of a shield arranged at one side of the sheet for protecting the same, said shield being provided with a plurality of spaced ribs on the side thereof facing the sheet and with a duct at the opposite side thereof through which is adapted to be circulated a temperature control medium, and a layer of insulation in contact with one wall of said duct.

5. In sheet glass apparatus, the combination with means for forming a sheet from a mass of molten glass, of a shield arranged at one side of the sheet for protecting the same, the lower portion of the shield being shaped to fit substantially in the curvature of the sheet meniscus while the upper portion thereof is provided with a duct extending transversely of the sheet through which is adapted to be circulated a temperature control medium, and means for insulating the rear wall of said duct.

6. In sheet glass apparatus, the combination with means for forming a sheet from a mass of molten glass, of a shield arranged at one side of the sheet for protecting the same, said shield being provided with a duct through which is adapted to be circulated a temperature control medium, and means carried by the shield for heating the border portions of said sheet.

7. In sheet glass apparatus, the combination with means for forming a sheet from a mass of molten glass, of a shield arranged at one side of the sheet for protecting the same, said shield being provided with a plurality of spaced ribs on the side thereof facing the sheet and with a duct at the opposite side thereof through which is adapted to be circulated a temperature control medium, and electric heating means carried by said shield and adapted to heat the border portions of said sheet.

8. In sheet glass apparatus, the combination with means for forming a sheet from a mass of molten glass, of a shield arranged at one side of the sheet for protecting the same, the lower portion of the shield being shaped to fit substantially in the curvature of the sheet meniscus and the upper portion thereof being provided with a duct at the back thereof extending transversely of the sheet and through which is adapted to be circulated a temperature control medium, and an electric heater carried at either side of the shield and projecting therebeyond for heating the border portions of said sheet.

9. In sheet glass apparatus, the combination with means for forming a sheet from a mass of molten glass, of a shield arranged at one side of the sheet for protecting the same, said shield consisting of a metallic plate having a plurality of spaced ribs on the side thereof facing the sheet, and a second plate carried by the back of the first plate but spaced therefrom to define a duct extending transversely of the sheet and through which is adapted to be circulated a temperature control medium.

10. In sheet glass apparatus, the combination with means for forming a sheet from a mass of molten glass, of a shield arranged at one side of the sheet for protecting the same, said shield consisting of a metallic plate, the lower portion thereof being shaped to fit substantially in the curvature of the sheet meniscus, a second plate carried by the back of the first plate but spaced therefrom to define a duct extending transversely of the sheet and through which is adapted to be circulated a temperature control medium, and a backing of insulation for the second named plate.

Signed at Pittsburgh, in the county of Allegheny, and State of Pennsylvania, this 23rd day of November, 1928.

WILLIBALD TRINKS.
JOHN D. KELLER.